United States Patent
Bahar

(10) Patent No.: US 8,627,671 B2
(45) Date of Patent: *Jan. 14, 2014

(54) SELF-CONTAINED ELECTROCHEMICAL HEAT TRANSFER SYSTEM

(75) Inventor: Bamdad Bahar, Chester, MD (US)

(73) Assignee: Xergy Incorporated, Georgetown, DE (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/771,620

(22) Filed: Apr. 30, 2010

(65) Prior Publication Data

US 2011/0127018 A1    Jun. 2, 2011

Related U.S. Application Data

(60) Provisional application No. 61/215,131, filed on May 1, 2009.

(51) Int. Cl.
F25D 23/12    (2006.01)

(52) U.S. Cl.
USPC .......................................... 62/259.2; 62/498

(58) Field of Classification Search
USPC .............. 62/3.1, 259.2, 115, 498, 238.6, 467; 29/890.03, 895.2; 165/104.12, 121; 204/241, 258; 417/48, 379
See application file for complete search history.

(56) References Cited

U.S. PATENT DOCUMENTS

| | | |
|---|---|---|
| 1,952,281 A | 3/1934 | Ranque |
| 2,913,511 A | 11/1959 | Grubb, Jr. |
| 3,432,355 A | 3/1969 | Niedrach et al. |
| 3,489,670 A | 1/1970 | Maget |
| 4,118,299 A | 10/1978 | Maget |
| 4,406,135 A | 9/1983 | Rojey et al. |
| 4,523,635 A | 6/1985 | Nishizaki et al. |
| 4,569,207 A | 2/1986 | James |

(Continued)

FOREIGN PATENT DOCUMENTS

| | | |
|---|---|---|
| JP | 10-170094 | 6/1998 |
| JP | 3996575 | 10/2007 |
| WO | 2008007108 A1 | 1/2008 |

OTHER PUBLICATIONS

"From Maget to Today," David Bloomfield, presented at a local meeting of the American Institute of Chemical Engineers (AIChE) in Boston, MA on Oct. 31, 2002, 26 pages.

(Continued)

*Primary Examiner* — Mohammad M Ali
(74) *Attorney, Agent, or Firm* — DiBerardino McGovern IP Group LLC

(57) ABSTRACT

A self-contained heat transfer system conveys heat from a first heat reservoir at a relatively low temperature to a second heat reservoir at relatively high temperature, the heat transfer system defining a closed loop that contains a working fluid. The self-contained heat transfer system includes a hermetically-sealed housing that defines an enclosure; a first heat transfer device having an exposed surface configured to be in thermal communication with the first heat reservoir; a second heat transfer device having an exposed surface configured to be in thermal communication with the second heat reservoir; and an electrochemical compressor within the enclosure and between the first and second heat transfer devices, wherein the electrochemical compressor includes one or more electrochemical cells, each electrochemical cell including a gas pervious anode, a gas pervious cathode, and an electrolytic membrane disposed between and in intimate electrical contact with the cathode and the anode.

36 Claims, 12 Drawing Sheets

(56) References Cited

U.S. PATENT DOCUMENTS

| | | | |
|---|---|---|---|
| 4,593,534 A * | 6/1986 | Bloomfield | 62/201 |
| 4,671,080 A | 6/1987 | Gross | |
| 4,829,785 A | 5/1989 | Hersey | |
| 4,865,701 A * | 9/1989 | Beck et al. | 205/375 |
| 5,024,060 A | 6/1991 | Trusch | |
| 5,209,081 A | 5/1993 | Matsuoka | |
| 5,523,181 A | 6/1996 | Stonehart et al. | |
| 5,547,551 A | 8/1996 | Bahar et al. | |
| 5,599,614 A | 2/1997 | Bahar et al. | |
| 5,635,041 A | 6/1997 | Bahar et al. | |
| 5,699,668 A | 12/1997 | Cox | |
| 5,746,064 A | 5/1998 | Tsenter | |
| 5,768,906 A | 6/1998 | Tsenter | |
| 5,900,031 A | 5/1999 | Bloomfield | |
| 5,941,079 A | 8/1999 | Bowman et al. | |
| 5,976,724 A | 11/1999 | Bloomfield | |
| 5,993,619 A | 11/1999 | Bloomfield et al. | |
| 6,068,673 A | 5/2000 | Bloomfield | |
| 6,167,721 B1 | 1/2001 | Tsenter | |
| 6,242,135 B1 | 6/2001 | Mushiake | |
| 6,254,978 B1 | 7/2001 | Bahar et al. | |
| 6,321,561 B1 | 11/2001 | Maget | |
| 6,425,440 B1 * | 7/2002 | Tsenter et al. | 165/104.12 |
| 6,553,771 B2 | 4/2003 | Tsenter | |
| 6,635,384 B2 | 10/2003 | Bahar et al. | |
| 7,456,543 B2 | 11/2008 | Makansi | |
| 7,470,267 B2 * | 12/2008 | Joshi et al. | 604/892.1 |
| 7,896,867 B2 * | 3/2011 | Gordon et al. | 604/892.1 |
| 8,088,535 B2 * | 1/2012 | Sommer et al. | 429/514 |
| 2004/0142215 A1 | 7/2004 | Barbir et al. | |
| 2004/0211679 A1 | 10/2004 | Wong et al. | |
| 2004/0253494 A1 | 12/2004 | Maruyama et al. | |
| 2006/0101830 A1 | 5/2006 | Cohen et al. | |
| 2006/0254286 A1 | 11/2006 | Johnson | |

OTHER PUBLICATIONS

International Search Report issued by Jae Chul Kim of the Korean Intellectual Property Office for the corresponding application PCT/US2010/033204 on Dec. 21, 2010, 3 sheets.

Written Opinion issued by Jae Chul Kim of the Korean Intellectual Property Office for the corresponding application PCT/US2010/033204 on Dec. 21, 2010, 3 sheets.

Ali Kilicarslan et al., "A comparative study of water as a refrigerant with some current refrigerants," Int. J. Energy Res. 2005; 29:947-959. Published online Jul. 18, 2005 in Wiley InterScience (www.interscience.wiley.com).

"Engineering a Membrane Electrode Assembly," John W. Weidner et al., The Electrochemical Society Interface, Winter, 2003, pp. 40-43.

Technical Specifications for "HOGEN Hydrogen Generation Systems," Proton Energy Systems, Inc., Oct. 2008, 2 pages.

"Teledyne Titan(TM) HM Generator Series Hydrogen/Oxygen Gas Systems," Teledyne Energy Systems, Inc., Jun. 2007, 2 pages.

* cited by examiner

SELF-CONTAINED ELECTROCHEMICAL HEAT TRANSFER SYSTEM

CROSS-REFERENCE TO RELATED APPLICATION

This application claims priority to U.S. Application No. 61/215,131, filed on May 1, 2009 and entitled "An Integrated and Modular Electrochemical Compressor and Heat Pump System," which is incorporated herein by reference in its entirety.

TECHNICAL FIELD

The disclosed subject matter relates to a self-contained heat transfer system having an electrochemical compressor.

BACKGROUND

The function of both heat transfer systems such as refrigeration cycles and heat pumps is to remove heat from a heat source or reservoir at low temperature and to reject the heat to a heat sink or reservoir at high temperature. While many thermodynamic effects have been exploited in the development of heat pumps and refrigeration cycles, the most popular today is the vapor compression approach. This approach is sometimes called mechanical refrigeration because a mechanical compressor is used in the cycle.

Mechanical compressors account for approximately 30% of a household's energy requirements and thus consume a substantial portion of most utilities' base load power. Any improvement in efficiency related to compressor performance can have significant benefits in terms of energy savings and thus have significant positive environmental impact. In addition, there are increasing thermal management problems in electronic circuits, which require smaller heat pumping devices with greater thermal management capabilities.

Vapor compression refrigeration cycles generally contain five important components. The first is a mechanical compressor that is used to pressurize a gaseous working fluid. After proceeding through the compressor, the hot pressurized working fluid is condensed in a condenser. The latent heat of vaporization of the working fluid is given up to a high temperature reservoir often called the sink. The liquefied working fluid is then expanded at substantially constant enthalpy in a thermal expansion valve or orifice. The cooled liquid working fluid is then passed through an evaporator. In the evaporator, the working fluid absorbs its latent heat of vaporization from a low temperature reservoir often called a source. The last element in the vapor compression refrigeration cycle is the working fluid itself.

In conventional vapor compression cycles, the working fluid selection is based on the properties of the fluid and the temperatures of the heat source and sink. The factors in the selection include the specific heat of the working fluid, its latent heat of vaporization, its specific volume and its safety. The selection of the working fluid affects the coefficient of performance of the cycle.

SUMMARY

In some general aspects, a self-contained heat transfer system conveys heat from a first heat reservoir at a relatively low temperature to a second heat reservoir at relatively high temperature, the heat transfer system defining a closed loop that contains a working fluid. The self-contained heat transfer system includes a hermetically-sealed housing that defines an enclosure; a first heat transfer device having an exposed surface configured to be in thermal communication with the first heat reservoir; a second heat transfer device having an exposed surface configured to be in thermal communication with the second heat reservoir; and an electrochemical compressor within the enclosure and between the first and second heat transfer devices, wherein the electrochemical compressor includes one or more electrochemical cells, each electrochemical cell including a gas pervious anode, a gas pervious cathode, and an electrolytic membrane disposed between and in intimate electrical contact with the cathode and the anode.

Implementations can include one or more of the following features. For example, the first heat transfer device can include at least a part of the housing. The exposed surface of the first heat transfer device can be a surface of the housing. The first heat transfer device can be at least partly within the enclosure. The second heat transfer device can include at least a part of the housing. The exposed surface of the second heat transfer device can be a surface of the housing. The second heat transfer device can be at least partly within the enclosure.

The first heat transfer device can be configured to transfer heat from the first heat reservoir to the working fluid. The second heat transfer device can be configured to transfer heat from the working fluid to the second heat reservoir.

The system can also include an expansion space fluidly coupled to the first and second heat transfer devices and configured to reduce a pressure of the working fluid.

The working fluid can contain one or more components that pass through the electrochemical compressor. The working fluid can contain one or more components that bypass the electrochemical compressor. In this case, the system can also include a mixing system that combines the one or more components that pass through the electrochemical compressor with the one or more components that bypass the electrochemical compressor. The one or more components that bypass the electrochemical compressor can include a condensable refrigerant. The condensable refrigerant can be configured to not participate in the electrochemical process.

The one or more components that pass through the electrochemical compressor can include an electrochemically active fluid that participates in the electrochemical process within the electrochemical compressor. The one or more components that pass through the electrochemical compressor can include one or more of methanol, ethanol, and water.

The working fluid can contain a single component that passes through the electrochemical compressor and that is both electrochemically active and is a refrigerant The first heat transfer device can include comprise a condenser. The second heat transfer device can include an evaporator.

The exposed surfaces of the heat transfer devices can be planar. The exposed surfaces of the heat transfer devices can be cylindrical such that the housing is annular.

In other general aspects, self-contained heat transfer system is manufactured by preparing a first portion of a housing, where the first housing portion includes a thermally-conductive wall; preparing a second portion of the housing, where the second housing portion is sized and shaped to mate with the first housing portion and includes a thermally-conductive wall; inserting an electrochemical compressor between interior surfaces of the thermally-conductive walls of the first and second housing portions; pressing the first and second housing portions together to form an enclosure that receives the electrochemical compressor such that the exterior surface of the first housing portion thermally-conductive wall is able to be exposed to a first heat reservoir and the exterior surface of the second housing portion thermally-conductive wall is able to be exposed to a second heat reservoir; inserting a working fluid into the enclosure through an opening; and hermetically sealing the first and second housing portions together and sealing the opening to define a closed loop that contains the working fluid in the enclosure.

Implementations can include one or more of the following features. For example, an expansion fluid passage can be formed in the first housing portion and an expansion fluid passage can be formed in the second housing portion, where the expansion fluid passages are fluidly linked to each other when the first and second housing portions are pressed together. The expansion fluid passage in the first housing portion can be fluidly coupled to a cavity formed between the first housing portion and the electrochemical compressor. The expansion fluid passage in the second housing portion can be fluidly coupled to a cavity formed between the second housing portion and the electrochemical compressor. The closed loop can be formed such that fluid passes through the expansion fluid passage in the second housing portion, through the expansion fluid passage in the first housing portion, through the cavity in the first housing portion, through the electrochemical compressor, through the cavity in the second housing portion, and back to the fluid passage in the second housing portion. The expansion fluid passages can be formed by forming the expansion fluid passages to have a size that enables a reduction in pressure of the working fluid as it passes through the expansion fluid passages.

The first and second housing portions can be hermetically sealed together by welding the first and second housing portions together, curing adhesive between the first and second housing portions, soldering the first and second housing portions together, and inserting a gasket between the first and second housing portions before pressing the first and second housing portions together.

The opening can be sealed by filling the opening with a leak-free adhesive.

The first housing portion can be prepared by forming the first housing portion into an annular shape. The second housing portion can be prepared by forming the second housing portion into an annular shape.

The first housing portion can be prepared by forming the first housing portion into a planar shape. The second housing portion can be prepared by forming the second housing portion into a planar shape.

Each of the housing portions can be prepared by die casting each of the housing portions. Each of the housing portions can be prepared by machining each of the housing portions.

DRAWING DESCRIPTION

DESCRIPTION

Figure 1:
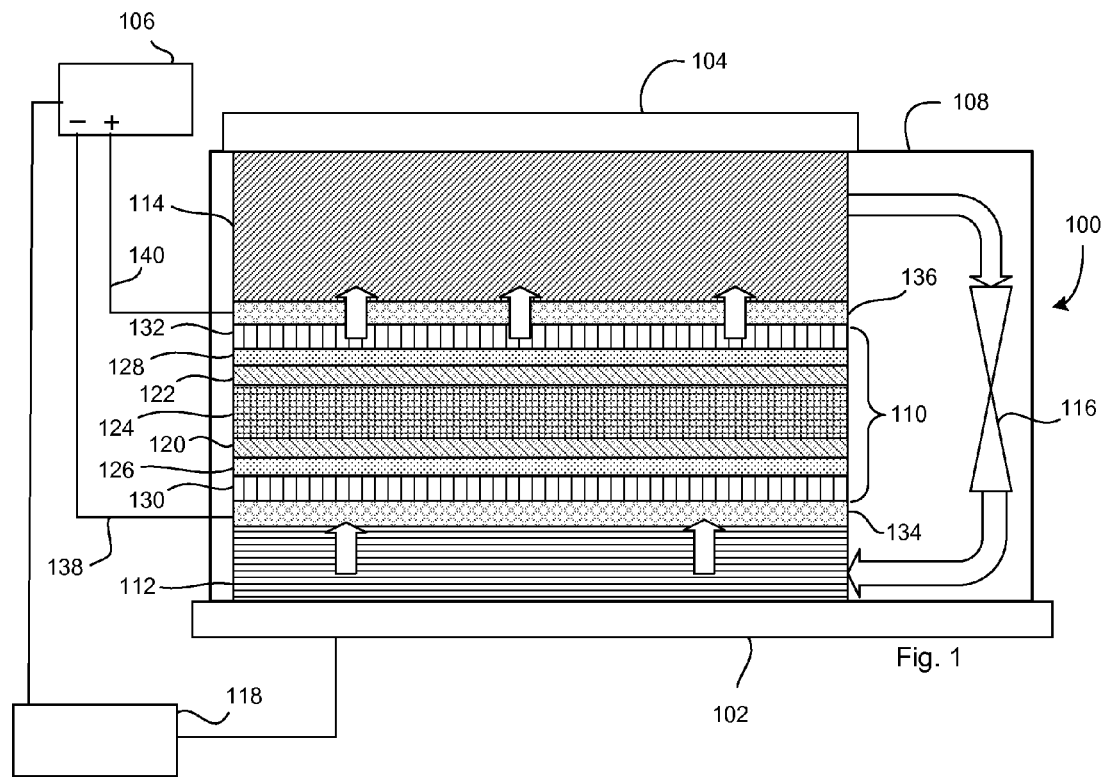
FIG. 1 is block diagram of a self-contained heat transfer system that defines a closed loop that contains a working fluid and includes an electrochemical compressor.

Referring to FIG. 1, a self-contained electrochemical heat transfer system 100 is used to convey heat from a first heat reservoir 102 at a relatively low temperature to a second heat reservoir 104 at a relatively high temperature. The heat transfer system 100 is self-contained since it constitutes a complete and independent unit in and of itself including all necessary components to function as a heat transfer system with merely a connection to a power supply 106. The power supply 106 can be a source of direct current electric power such as a battery or a rectifier or any other electric source capable of delivering direct current.

The heat transfer system 100 is a complete and independent unit because it is designed as a hermetically-sealed housing 108 having an internal enclosure that is impervious to fluids outside the housing 108. The heat transfer system 100 is sized proportionally to a required cooling capacity and the size and shape of the system 100 is also be determined by the size and shape of the first heat reservoir. The heat transfer system 100 defines within its internal enclosure a closed loop that contains a working fluid (which is represented by the block arrows in FIG. 1).

The heat transfer system 100 is an electrochemical system in that it includes an electrochemical compressor 110 within its internal enclosure. The electrochemical compressor 110 lacks moving parts and receives all of its energy from the power supply 106.

The heat transfer system 100 includes a first heat transfer device 112 that transfers heat from the first heat reservoir 102 (which is any heat source or object to be cooled) to the working fluid, a second heat transfer device 114 that transfers heat from the working fluid to the second heat reservoir 104 (which is a heat sink), and an expansion space 116 fluidly linking the first and second heat transfer devices. The first heat transfer device 112 includes an evaporator that acts as a heat exchanger that places the working fluid in a heat exchange relationship with the first heat reservoir 102. The second heat transfer device 114 includes a condenser that acts as a heat exchanger that places the working fluid in a heat exchange relationship with the second heat reservoir 104.

To enable the heat transfer, the first heat transfer device 112 has an exposed surface that is configured to be in thermal communication with the first heat reservoir 102 and the second heat transfer device 114 has an exposed surface that is configured to be in thermal communication with the second heat reservoir 104. The exposed surface of either or both of the heat transfer devices 112, 114 can be an exposed surface of the housing 108; in such a design, the wall of the housing 108 with the exposed surface is a thermally-conductive wall that would be considered a part of the respective heat transfer device so that the housing wall is an integral part of the heat transfer. The heat transfer devices 112, 114 can also include portions that are within the enclosure, so that they extend from exposed surface inward toward the compressor 110. Some exemplary designs of the heat transfer devices 112, 114 are shown and discussed below.

The expansion space 116 is an orifice or opening that controls the amount of working fluid flow. The expansion space 116 can include a temperature sensing bulb filled with a similar gas as in the working fluid that causes a valve to open against the spring pressure in the valve body as the temperature on the bulb increases. As the temperature in the first heat transfer device 112 decreases, so does the pressure in the bulb and therefore on the spring causing the valve to close.

The power supply 106 is controlled by a control system 118, which is connected to at least one sensor that measures or estimates a temperature of the first heat reservoir 102. In this way, the control system 118 provides closed-loop control of the operation of the power supply 106 and therefore the amount of cooling provided by the system 100 based on the temperature of the first heat reservoir 102.

The working fluid contained within the closed loop of the heat transfer system 100 includes at least a component (which can be referred to as a first component if other components are present in the working fluid) that is electrochemically active and therefore takes part in the electrochemical process within the compressor 110. If the working fluid includes only one component, then this component would also provide a heat transfer function in the closed loop. Thus, the component would also have to undergo a transformation as it is transferred between the first heat transfer device 112 and the second heat transfer device 114, such transformation can include a phase change, though a phase change is not necessary to fulfill the heat transfer function.

One particular suitable single-component working fluid is hydrogen. While hydrogen is being used primarily as the electrochemically active component of the working fluid, hydrogen also possesses useful heat transfer properties. Hydrogen's low density, high specific heat, and thermal conductivity make it an acceptable coolant. Thus, the presence of hydrogen gas within the working fluid (either within a single-component working fluid or a multi-component working fluid) enhances the performance of the condensable refrigerant; and provides thermal exchange opportunities at points away from thermally conductive surfaces of the fluid conduits and the heat transfer devices. Other suitable single-component working fluids are possible, for example, water, methanol, ethanol, butanol, propanol, or any polar fluid.

Figure 19:
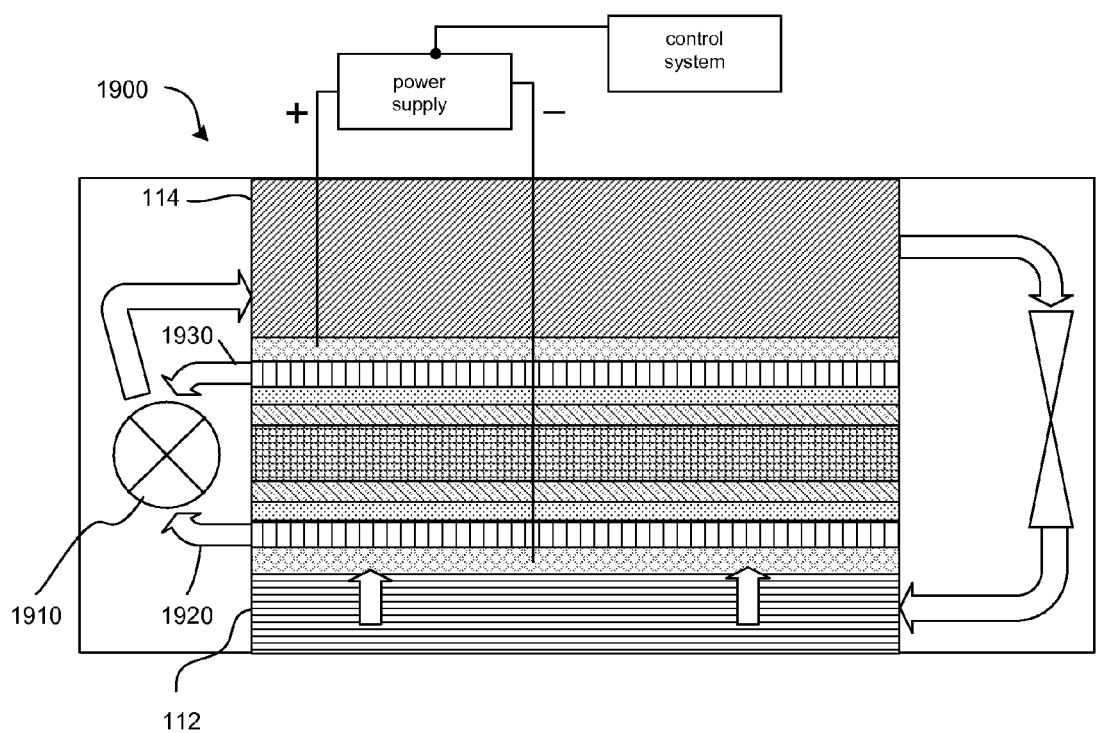
FIG. 19 is a block diagram of a self-contained heat transfer system that defines a closed loop that contains a multi-component working fluid and includes an electrochemical compressor.

In some implementations (one of which is shown in FIG. 19), the working fluid includes at least a second component that is a condensable refrigerant that can be used for the heat transfer application under consideration. The condensable refrigerant is any suitable condensable composition that does not include water. As discussed below, the condensable refrigerant bypasses the electrochemical process within the compressor 110.

Additionally, the working fluid can include a third component such as water to hydrate an ion exchange membrane within the compressor 110 (as discussed below). Water can be considered a contaminant of some standard refrigerants, and it can negatively impact heat exchange performance of the refrigerant. Thus water as a component of the working fluid can be reduced for example, to a minimal amount that is needed to provide enough hydration to one or more components of the compressor 110.

In some implementations, the first component (which is electrochemically active) includes hydrogen ($H_2$), the second component (which is a condensable refrigerant) includes methanol, and the third component is water. In this implementation, all components would be able to pass through the compressor 110, though some may not engage in electrochemical activity. The components can be present in the proportion of approximately 5% hydrogen and 95% methanol by weight. The relative proportions of hydrogen and methanol are governed by the desired relative efficiency of the electrochemical compressor 110 and the system 100. The quantity of water maintained in the working fluid is governed by the thickness of membranes employed in the compressor 110, the equivalent weight (acidity) of the ion exchange media employed in the compressor 110, and the amount of hydrogen in the system 100. Thinner membranes of higher equivalent weight (that is, lower acidity) employed in systems with lower proton capability require less water. In general, the working fluid includes less than 50% of water, but can include less than 20%, less than 10%, or less than 1% water, depending on the application.

If hydrogen is used as a multi-component working fluid that also includes a condensable refrigerant that bypasses electrochemical compression, then the hydrogen would be compressed by the compressor 110 to a much higher pressure than the final working fluid pressure, and would then mix with the lower pressure component of the working fluid (the one that bypasses the compressor 110). Such a design is shown in FIG. 19. The exact pressure requirements for the hydrogen stream depends on the volume of condensable component being pressurized in relation to the volume of hydrogen, the desired final pressure requirements of the mixed stream, and the targeted energy efficiency. In some implementations, check valves can be employed to make sure the gas flows are maintained in the intended directions and that no back flow is allowed towards the compressor 110.

The working fluid can include chlorine as a component; chlorine could be used advantageously in an anionic exchange membrane cell. The choice of the refrigerant depends on the exact application under consideration and other external regulatory factors. Care should be taken in the selection of the refrigerant to ensure that the refrigerant does not degrade the electrochemical performance of the system or poison the electrocatalyst employed in the compressor 110.

Generally, the refrigerant used in the working fluid should have good thermodynamic properties, be noncorrosive, stable, and safe. The desired thermodynamic properties are at a boiling point somewhat below the target temperature, a high heat of vaporization, a moderate density in liquid form, a relatively high density in gaseous form, and a high critical temperature. Since boiling point and gas density are affected by pressure, refrigerants can be made more suitable for a particular application by choice of operating pressure. The refrigerant can be electrochemically active, in which case it could take part in electrochemical compression.

The electrochemical compressor 110 is a device that raises the pressure of at least one component of the working fluid by an electrochemical process. Accordingly, at least one component of the working fluid must be electrochemically active. In particular, the electrochemically active component (the first component) must be ionizable. For example, the electrochemically active component is oxidized at a gas pervious anode 120 of the compressor 110 and is reduced at a gas pervious cathode 122 of the compressor 110.

In this implementation, the compressor 110 includes only one exemplary cell. However, the electrochemical compressor 110 can include a plurality of electrochemical cells, as shown in FIGS. 3A-C of U.S. application Ser. No. 12/626,416, filed Nov. 25, 2009 and entitled "Electrochemical Compressor and Refrigeration System," which is incorporated herein by reference in its entirety. In some implementations, the electrochemical compressor 110 is an annular stack of electrochemical cells electrically connected in series such as, for example, the cells generally described in U.S. Pat. No. 2,913,511 (Grubb); in U.S. Pat. No. 3,432,355 (Neidrach); and in U.S. Pat. No. 3,489,670 (Maget).

The compressor 110 includes an electrolyte 124 that serves to conduct the ionic species ($EC^+$) from the anode 120 to the cathode 122. The electrolyte 124 can be an impermeable solid ion exchange membrane having a porous microstructure and an ion exchange material impregnated through the membrane such that the electrolyte 124 can withstand an appreciable pressure gradient between its anode and cathode sides. The examples provided here employ impermeable ion exchange membranes, and the electrochemically active component of the working fluid is remixed with the working fluid after compression and thus the pressure of the working fluid is elevated prior to the condensation phase of the refrigeration process. However, a permeable ion exchange membrane is also feasible with the working fluid traversing in a unidirectional and sequential path through electrode assemblies with increasing pressure. The active components of the working fluid dissolve into the ion exchange media of the ion exchange membrane and the gas in the working fluid traverses through the ion exchange membrane.

As another example, the electrolyte 124 can be made of a solid electrolyte, for example, a gel, that is, any solid, jelly-like material that can have properties ranging from soft and weak to hard and tough and being defined as a substantially dilute crosslinked system that exhibits no flow when in the steady-state. The solid electrolyte can be made very thin, for example, it can have a thickness of less than 0.2 mm, to provide additional strength to the gel. Alternatively, the solid electrolyte can have a thickness of less than 0.2 mm if it is reinforced with one or more reinforcing layers like a polytetrafluoroethylene (PTFE) membrane (having a thickness of about 0.04 mm or less) depending on the application and the ion exchange media of the electrolyte.

Each of the anode 120 and the cathode 122 can be an electrocatalyst such as platinum or palladium or any other suitable candidate catalyst. The electrolyte 124 can be a solid polymer electrolyte such as Nafion (trademark for an ion exchange membrane manufactured by the I.E. DuPont DeNemours Company) or GoreSelect (trademark for a composite ion exchange membrane manufactured by W.L. Gore & Associates Inc.). The catalysts (that is, the anode 120 and the cathode 122) are intimately bonded to each side of the electrolyte 124. The anode 120 includes an anode gas space (a gas diffusion media) 126 and the cathode 122 includes a cathode gas space (a gas diffusion media) 128. The electrodes (the anode 120 and the cathode 122) of the compressor 110 can be considered as the electrocatalytic structure that is bonded to the solid electrolyte 124. The combination of the electrolyte 124 (which can be an ion exchange membrane) and the electrodes (the anode 120 and the cathode 122) is referred to as a membrane electrode assembly or MEA.

Adjacent the anode gas space 126 is an anode current collector 130 and adjacent the cathode gas space 128 is a cathode current collector 132. The anode collector 130 and the cathode collector 132 are electrically driven by the power supply 106 through respective meshes 134, 136. The anode collector 130 and the cathode collector 132 are porous, electronically conductive structures that can be woven metal screens (also available from Tech Etch) or woven carbon cloth or pressed carbon fiber or variations thereof. The pores in the current collectors 130, 132 serve to facilitate the flow of gases within the gas spaces 126, 128 adjacent to the respective electrodes 120, 122.

As mentioned, outer surfaces of the collectors 130, 132 can be electrically connected to and pressed against respective meshes 134, 136, which are electrically connected to respective outputs 138, 140 of the power supply 106. If the meshes 134, 136 are not used, then the outputs 138, 140 would be directly connected to the collectors 130, 132. The meshes 134, 136 are electrically conductive structures having pores that are generally larger than the pores of the collectors 130, 132. The meshes can be woven metal screens, woven carbon cloth, or pressed carbon fiber. The meshes 134, 136 also provide structural support to the compressor 110.

Additionally, subassemblies of components of the electrochemical compressor or cells (if the compressor includes a plurality of cells) can be commercially obtained from manufacturers such as W.L. Gore & Associates Inc. under the PRIMEA trademark or Ion Power Inc. Commercially available assemblies are designed for oxygen reduction on one electrode and therefore the electrodes (the anode 120 and cathode 122) may need to be modified for hydrogen reduction.

Hydrogen reduction at the cathode 122 actually requires lower loadings of precious metal catalysts and also is feasible with alternative lower cost catalysts such as palladium. Thus, the eventual production costs of assemblies employed in the system 100 are substantially lower than typical fuel cell components.

As mentioned above, the control system 118 is coupled to one or more temperature sensors placed near the first heat reservoir 102 to monitor or measure the temperature of first heat reservoir 102. Additionally, the control system 118 sends a signal to the power supply 106 to control an amount of power to drive the electrochemical compressor 110 based at least in part on the feedback obtained from the temperature sensors. The control system 118 can be a general system including sub-components that perform distinct steps.

The control system 118 can include one or more of digital electronic circuitry, computer hardware, firmware, and software. The control system 118 can also include appropriate input and output devices, a computer processor, and a computer program product tangibly embodied in a machine-readable storage device for execution by a programmable processor. A procedure embodying these techniques may be performed by a programmable processor executing a program of instructions to perform desired functions by operating on input data and generating appropriate output. Generally, a processor receives instructions and data from a read-only memory and/or a random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

The control system 118 receives information from the temperature sensor and controls operation of a procedure that can either maintain the heat source or the heat sink at a relatively constant temperature condition. Additionally, controlling the operation of an electrochemical compressor 110 consists of turning its current on or off through the power supply 106. Alternatively, the voltage applied to the electrochemical compressor 110 can be set to be in proportion to the heat source fluid temperature or the heat sink fluid temperature (if fluids are used in the heat source or heat sinks). In some applications, such as electric cars without internal combustion engines, there may be an advantage in operating the vehicle air conditioning system electrically and driving each wheel independently without a central motor (required to drive the air conditioning system).

Figure 2:
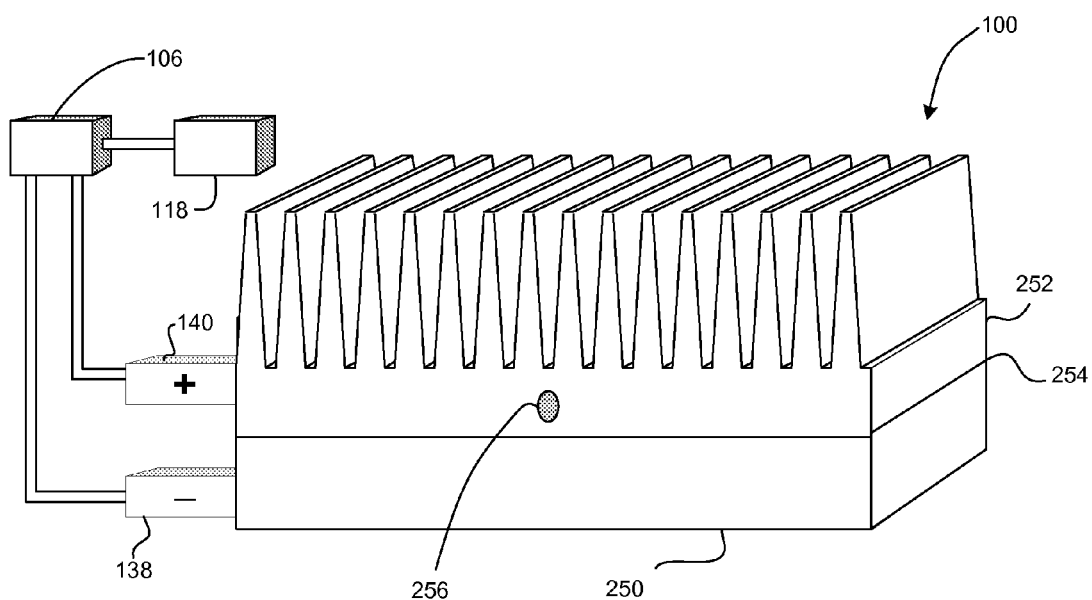
FIG. 2 is a perspective view of the self-contained heat transfer system of FIG. 1.

Referring also to FIG. 2, the hermetically-sealed housing 108 is designed with two portions 250, 252, each portion 250, 252 including one or more walls including at least one thermally-conductive wall. The portions 250, 252 are each designed with an internal opening or cavity to receive the compressor 110 and the respective meshes 134, 136, as shown below in the exemplary system shown in FIG. 3. The two portions 250, 252 are sized and shaped to mate with each other at an interface 254. At least one of the portions 250, 252 includes an opening 256 through which the working fluid is initially inserted into the enclosure.

The closed loop is formed such that the working fluid passes through the expansion space 116, then through a cavity in the first heat transfer device 112 (which is within the first housing portion 250), through the electrochemical compressor 110, then through a cavity in the second heat transfer device 114 (which is within the second housing portion 252), and back to the expansion space 116. Heat is transferred using the working fluid as it is circulated through and contained within the closed loop of the heat transfer system 100.

Low pressure (that is, unpressurized) working fluid (which can be a mixture of hydrogen, methanol, and water) enters the compressor 110 after it exits the expansion space 116. If the working fluid includes a condensable refrigerant that does not engage in electrochemical activity, then the electrochemically active component(s) (such as hydrogen and water) is dissociated from the condensable refrigerant. In this case, the electrochemically active component(s) dissolve into the ion exchange media while the condensable refrigerant is diverted along a path separate from the electrochemical path through the membrane electrode assembly. In any case, the electrochemically active component(s) is pumped across the membrane electrode assembly of the compressor 110. In particular, electrons are stripped from the component(s) at the anode collector 130, and the ions are transported across the anode 120, the electrolyte 124, and toward the cathode 122 due to the electrical potential applied across the collectors 130, 132 from the power supply 106. Next, the ions are recombined with the electrons at the cathode collector 132 to reform the gas at a higher pressure, and this higher pressure gas is recombined with any diverted condensable refrigerant (if diverted condensable refrigerant is present, as shown in FIG. 19) to thereby raise the pressure of the working fluid.

Thus, the electrochemical compressor 110 raises the pressure of the working fluid and delivers the higher pressure working fluid to the second heat transfer device 114, where the condensable refrigerant is precipitated by heat exchange with the sink fluid. The working fluid is then reduced in pressure in the expansion space 116. Subsequently, the low pressure working fluid is delivered to the first heat transfer device 112 where the condensed phase of the working fluid is boiled by heat exchange with the source fluid. The effluent working fluid within the first heat transfer device 112 may be partially in the gas phase and partially in the liquid phase when it is returned to the electrochemical compressor 110. In the process, heat energy is transported from the first heat transfer device 112 (the evaporator) to the second heat transfer device 114 (the condenser) and consequently, from the heat source at a relatively lower temperature to the heat sink at relatively higher temperature.

Concurrently, the control system 118 controls the amount of electrical potential applied to the current collectors 130, 132 of the compressor 110, and therefore also controlling the amount of heat energy transported from the evaporator to the condenser. The control system 118 receives information from the one or more sensors at the heat reservoir 102 or at the heat reservoir 104 indicating physical characteristics at key locations. The control system 118 analyzes the information and determines whether physical properties of the heat transfer system 100 need to be adjusted based on the analyzed information. For example, the control system 118 can determine that a current applied to the compressor 110 (and therefore the current applied to the electrode collectors 130, 132) needs to be adjusted. As another example, the control system 118 can determine that a flow rate of one or more of the heat sink fluid and the heat source fluid that transport heat from and to the devices 112, 114 needs to be adjusted. If the control system 118 determines that a physical property of the system 100 should be adjusted, then the control system 118 sends a signal to the component that is affected to adjust the particular property. For example, the control system 118 can send a signal to the power supply 106 to adjust the amount of current applied to the current collectors 130, 132 in the compressor 110. Otherwise, the control system 118 continues to receive information from the one or more sensors.

Figure 3:
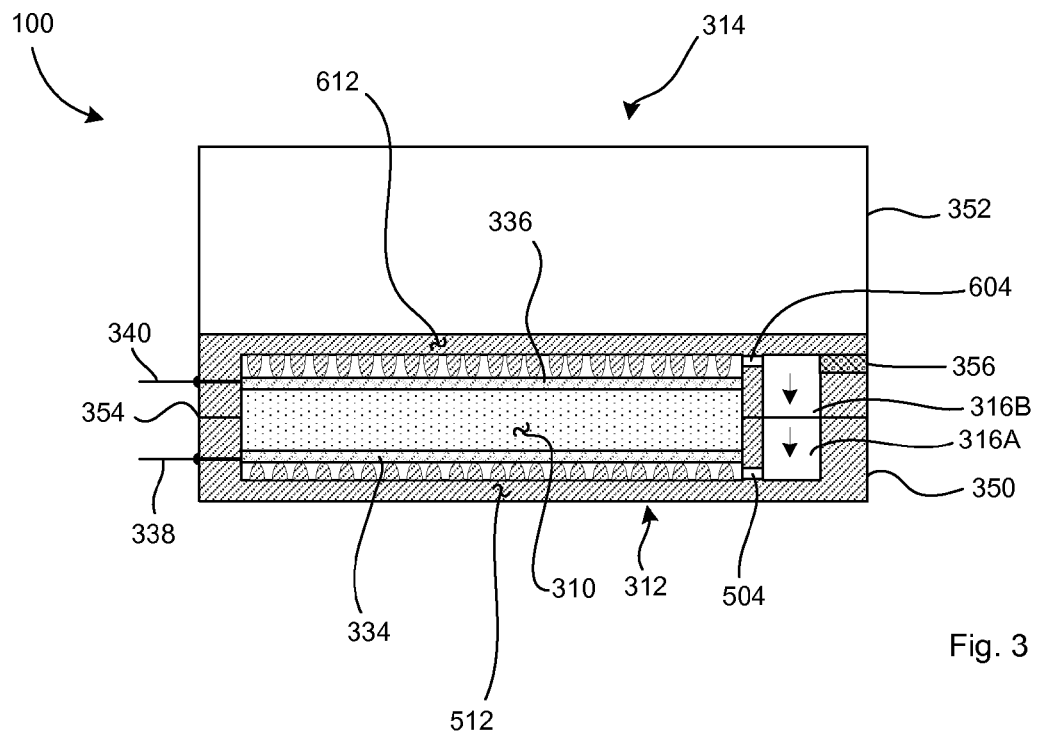
FIG. 3 is an aligned cross-sectional view of an exemplary self-contained heat transfer system based on the design of FIGS. 1 and 2.
Figure 4:
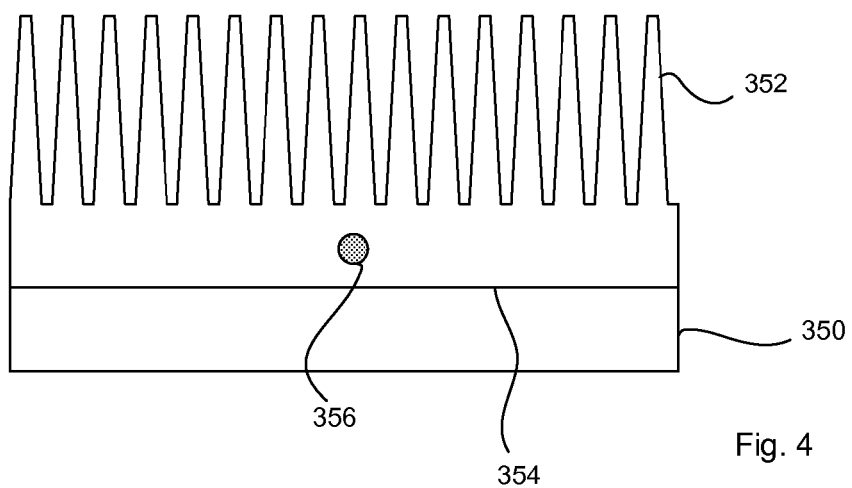
FIG. 4 is a side view of the heat transfer system of FIG. 3.

Referring to FIGS. 3 and 4, an exemplary heat transfer system 300 is designed with the features of the system 100 in that the system 300 is a self-contained electrochemical heat transfer system formed between and from first and second housing portions 350, 352. The first and second housing portions 350, 352 can be made of any thermally conductive material such as aluminum, zinc, gold, alloys of metals, or thermally-conductive polymers. The first and second housing portions 350, 352 receive an electrochemical compressor 310 sandwiched between a first heat transfer device 312 and a second heat transfer device 314. For simplicity, the electrochemical compressor 310 is shown in block form in FIG. 3; however, the compressor 310 includes all of the components that make up the compressor 110 shown in FIG. 1 and described above. The first and second heat transfer devices 312, 314 are respectively housed in and incorporated in the first and second housing portions 350, 352, which are joined along an interface 354. The second housing portion 352 also includes an opening 356 that is sealed with a suitable sealant such as epoxy after working fluid is introduced into the cavity formed between the portions 350, 352.

Figure 5A:
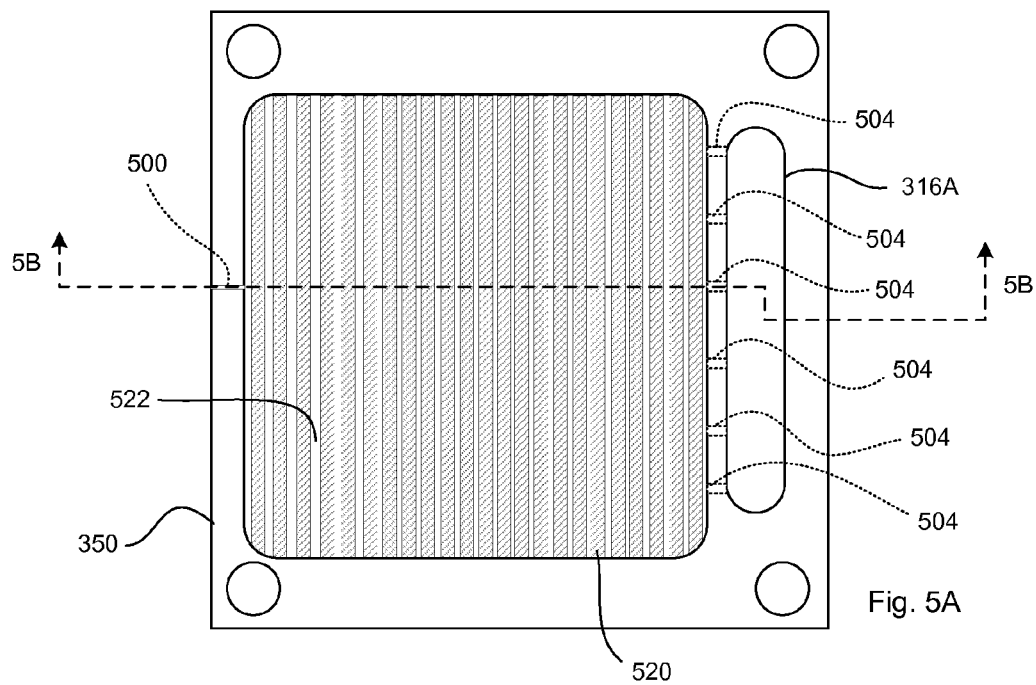
FIG. 5A is a plan view of a first portion of a housing of the heat transfer system of FIGS. 3 and 4.
Figure 5B:
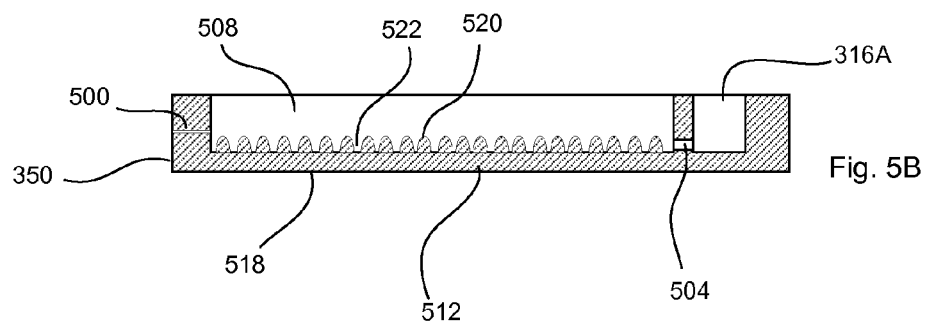
FIG. 5B is an aligned side cross-sectional view taken along 5B-5B of the first portion of the housing of FIG. 5A.

Referring also to FIGS. 5A and 5B, the first housing portion 350 includes an opening 500 for receiving the output 338 from the power supply 106. The first housing portion 350 also includes an opening 316A that is one half of the expansion space, the other half formed from an opening 316B (shown in FIGS. 3, 6A, and 6C) within the second housing portion 352.

The opening 316A is aligned with the opening 316B when the housing portions 350, 352 are pressed together, as shown in FIG. 3.

The first housing portion 350 also includes one or more channels 504 that fluidly connect the opening 316A with a cavity 508 that is sized and shaped to receive the mesh 334, the working fluid, and at least part of the electrochemical compressor 310. The first housing portion 350 includes a thermally-conductive wall 512 that defines a surface 518 that is exposed to the first heat reservoir. The thermally-conductive wall 512 is an integral part of a first heat transfer device 312. The thermally-conductive wall 512 of the first heat transfer device 312 also includes an inner surface having protrusions 520 (only one of which is labeled in each of FIGS. 5A and 5B for simplicity) that are separated by gaps or spaces 522 (only one of which is labeled in each of FIGS. 5A and 5B for simplicity) through which the working fluid flows. The mesh 334 makes physical contact with the protrusions 520 when the housing portions 350, 352 are pressed together. Much of the working fluid likely vaporizes within the spaces 522 since the spaces 522 are the areas/regions that place the working fluid the closest in distance to the first heat reservoir.

Figure 6C:
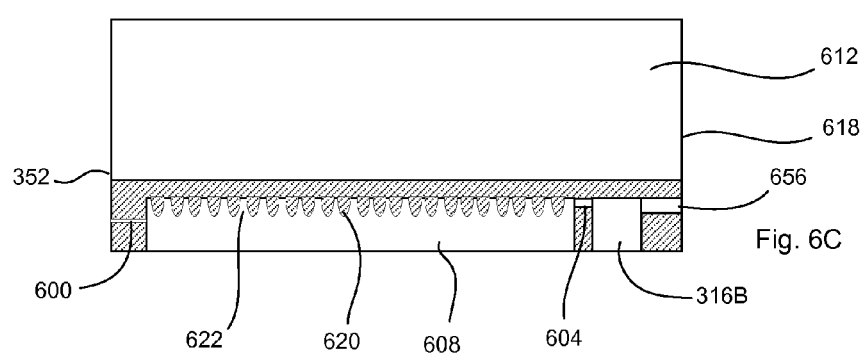
FIG. 6C is an aligned cross-sectional view taken along 6C-6C of the second portion of the housing of FIG. 6A.
Figure 6A:
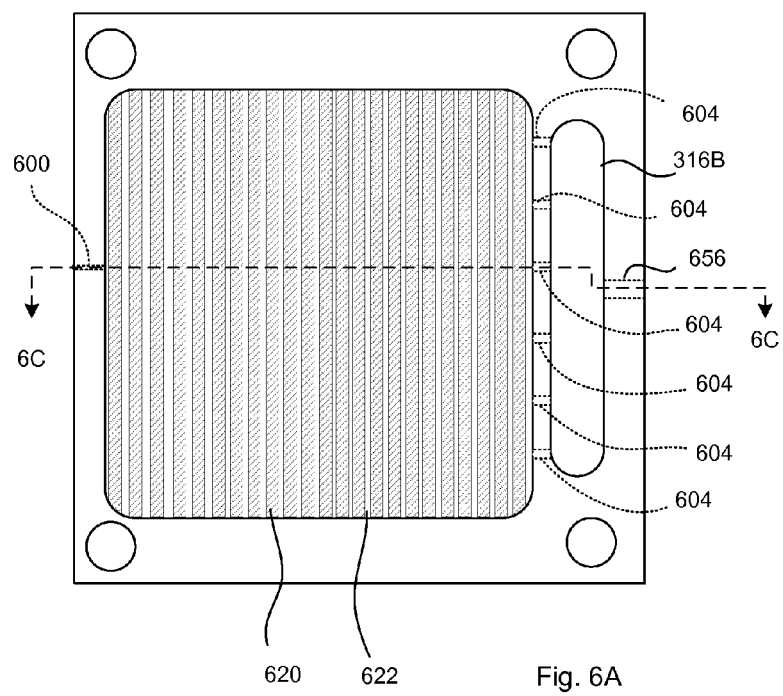
FIG. 6A is a plan view of a second portion of the housing of the heat transfer system of FIGS. 3 and 4.
Figure 6B:
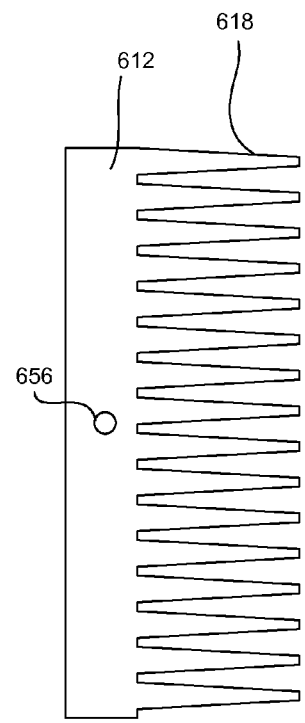
FIG. 6B is a side view of the second portion of the housing.

Referring also to FIGS. 6A-6C, the second housing portion 352 includes an opening 600 for receiving the output 340 from the power supply 106. The second housing portion 352 also includes the opening 316B that is one half of the expansion space. The opening 316B aligns with the opening 316A when the housing portions 350, 352 are pressed together, as shown in FIG. 3.

The second housing portion 352 also includes one or more channels 604 that fluidly connect the opening 316B with a cavity 608 that is sized and shaped to receive the mesh 336, the working fluid, and at least part of the electrochemical compressor 310. The second housing portion 352 includes an opening 656 through which the working fluid is initially inserted into the enclosure; the opening 656 is a through opening that extends from an exterior of the portion 352 to the opening 316B.

The second housing portion 352 includes a thermally-conductive wall 612 that defines a surface 618 that is exposed to the second heat reservoir. The wall 612 can be shaped, as shown in FIGS. 4 and 6B, with fins to increase the area of the surface 618 exposed to the second heat reservoir. The thermally-conductive wall 612 is an integral part of a second heat transfer device 314. The thermally-conductive wall 612 of the second heat transfer device 314 also includes an inner surface having protrusions 620 (only one of which is labeled in each of FIGS. 6A and 6C for simplicity) that are separated by gaps or spaces 622 (only one of which is labeled in each of FIGS. 6A and 6C for simplicity) through which the working fluid flows. The mesh 336 makes physical contact with the protrusions 620 when the housing portions 350, 352 are pressed together. Much of the condensable portion of the working fluid likely condenses within the spaces 622 since the spaces 622 are the areas/regions that place the working fluid the closest in distance to the second heat reservoir.

Figure 7:
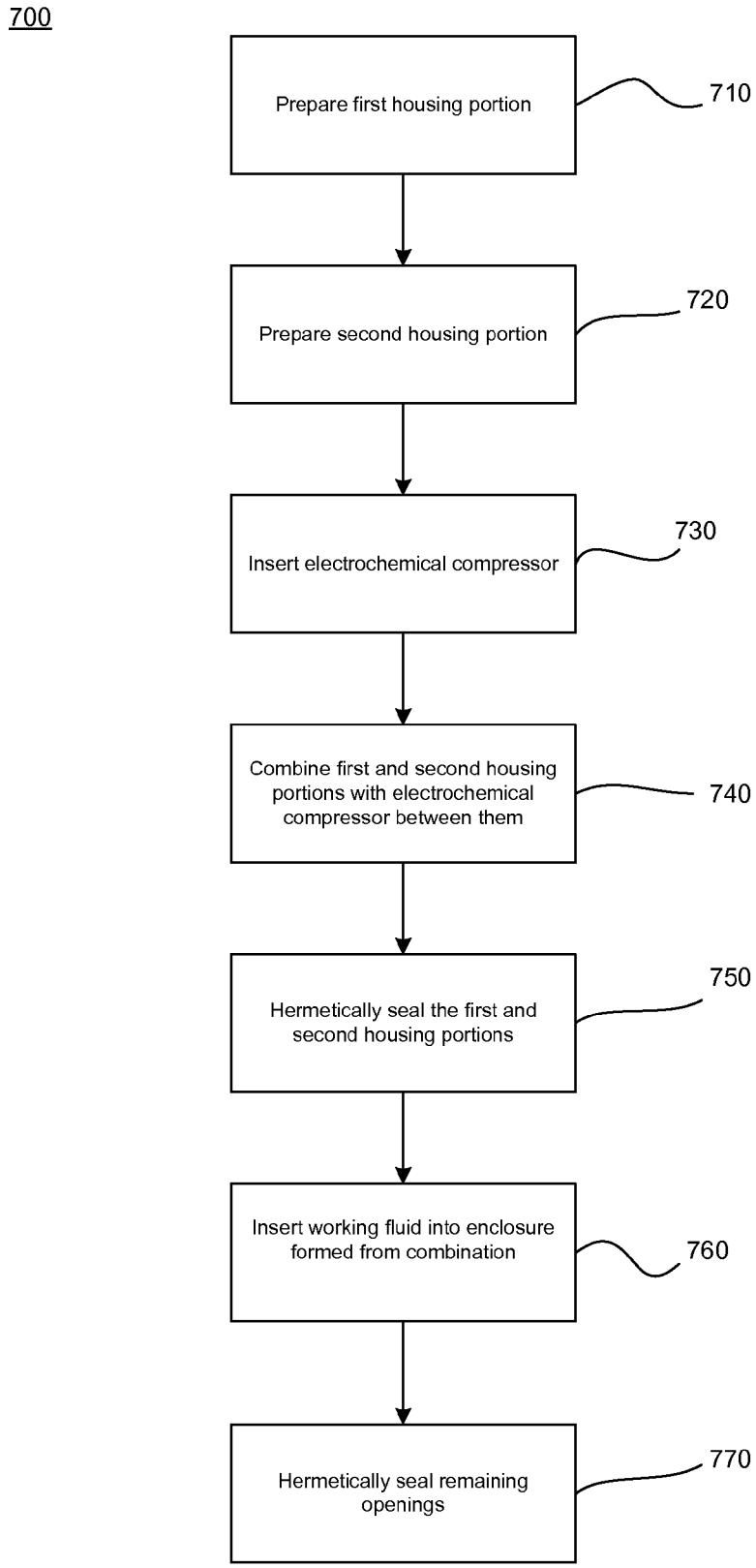
FIG. 7 is a flow chart of a procedure for manufacturing the heat transfer system of FIGS. 3-6C.

Referring to FIG. 7, a procedure 700 is performed to manufacture the self-contained heat transfer system 300. Initially the first housing portion 350 is prepared (step 710) and the second housing portion 352 is prepared (step 720). Each of the housing portions 350, 352 can be prepared by any suitable method, such as, for example, die casting each of the housing portions 350, 352. In die casting, molten metal is forced under high pressure into mold cavities (which are machined into dies) and then permitted to cool before being removed. The die casting method is especially suited in this application since a large quantity of small to medium sized parts may be needed with good detail, a fine surface quality, and dimensional consistency. In other implementations, the housing portions 350, 352 are machined from blanks into the appropriate geometries. For example, the cavities 508, 608 and the openings 316A, B can be machined into respective blanks. In some implementations, it is possible to use both methods of die casting and machining to form the housing portions 350, 352.

Figure 12:
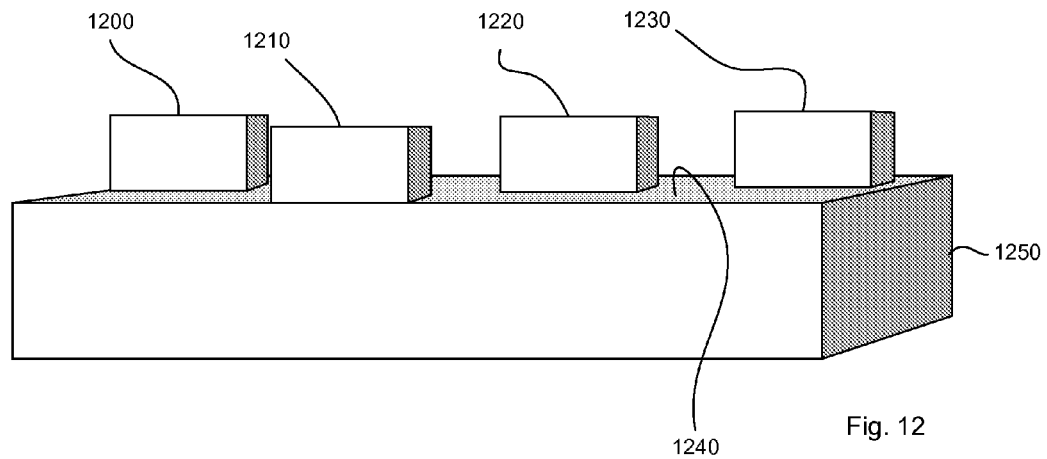
FIG. 12 is a perspective view of a plurality of self-contained heat transfer systems combined for use at distinct locations on a single device to be cooled.
Figure 13:
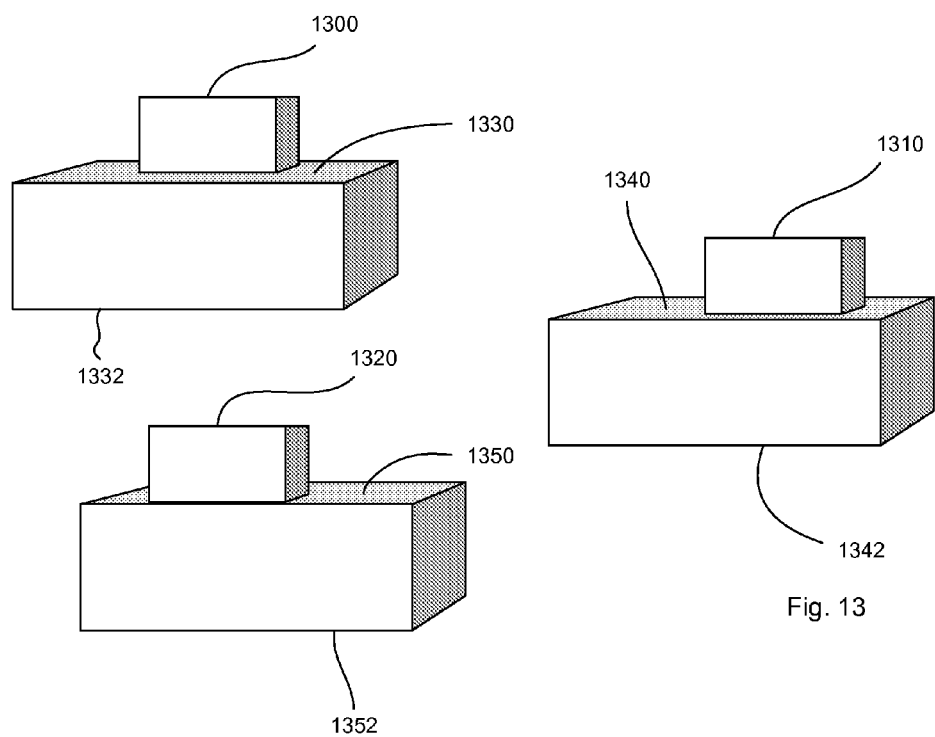
FIG. 13 is a perspective view of a plurality of self-contained heat transfer systems, each system at a location on a respective device to be cooled.
Figure 14:
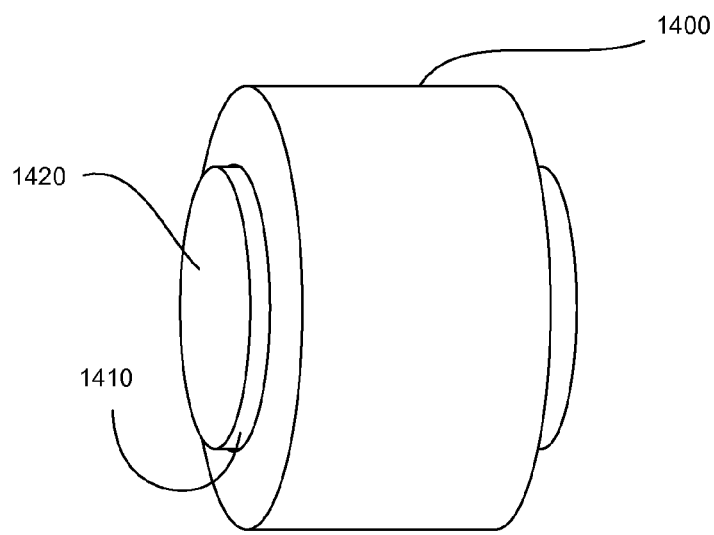
FIG. 14 is a perspective view of an annularly-shaped self-contained heat transfer system for cooling a cylindrically-shaped device.
Figure 15:
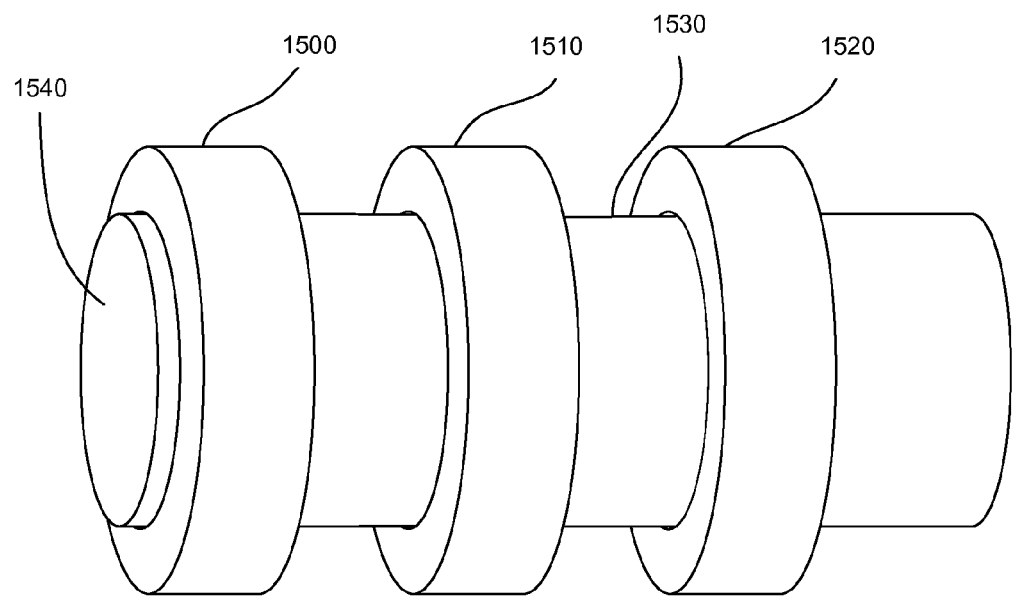
FIG. 15 is a perspective view of a plurality of annularly-shaped self-contained heat transfer systems for cooling at distinct locations of a single cylindrically-shaped device.

The shapes of the housing portions 350, 352 are determined based in part on the heat transfer application and the geometries of the heat reservoirs. For example, if the first heat reservoir has a planar shape (such as shown in FIGS. 12 and 13), then the housing portions 350, 352 would have planar shapes. As another example, if the first heat reservoir has a cylindrical shape (such as shown in FIGS. 14 and 15), then the housing portions 350, 352 would have annular shapes.

Figure 8:
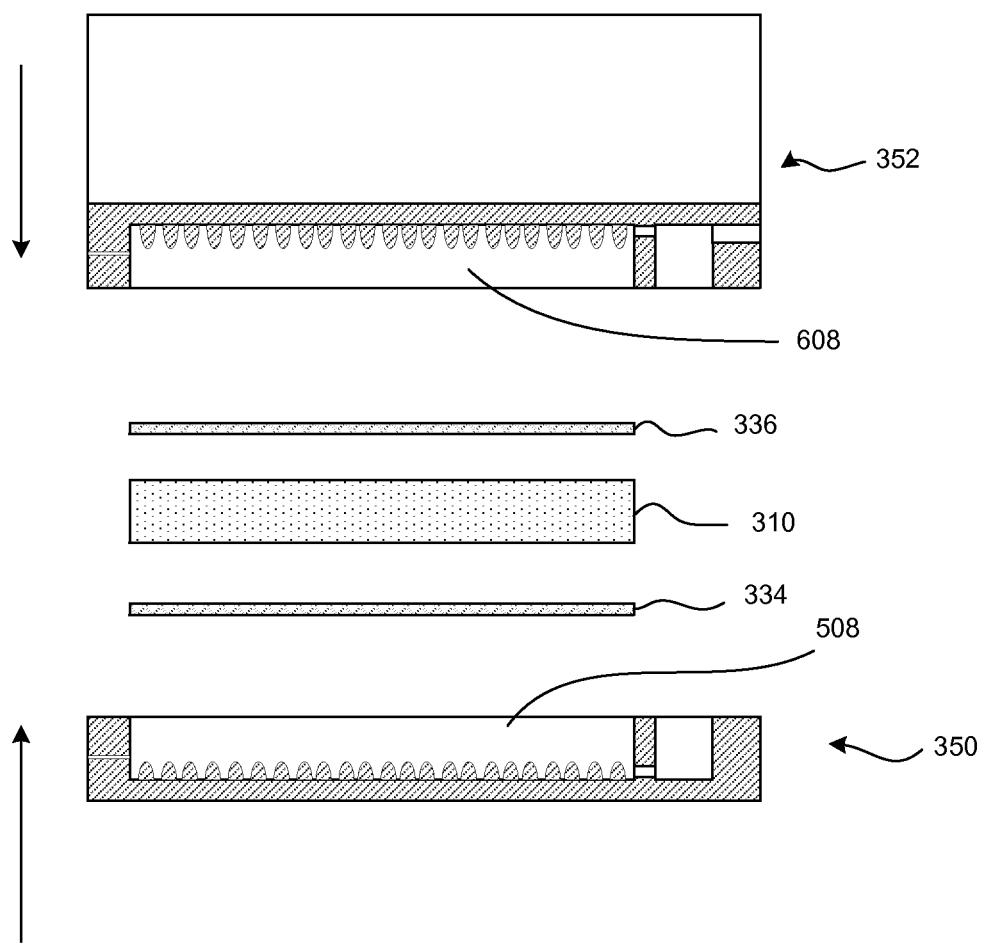
FIGS. 8-11 are cross-sectional views of the housing portions and internal components that demonstrate steps of the manufacturing procedure of FIG. 7.

Next, the electrochemical compressor 310 is inserted between the first and second housing portions 350, 352 (step 730) and the housing portions 350, 352 are combined or pressed together with the compressor 310 positioned partly within each of the cavities 508, 608 (step 740), as shown in FIG. 8. After the housing portions 350, 352 are pressed together (step 740), the housing portions 350, 352 are hermetically sealed at the interface 354 (step 750).

Figure 9A:
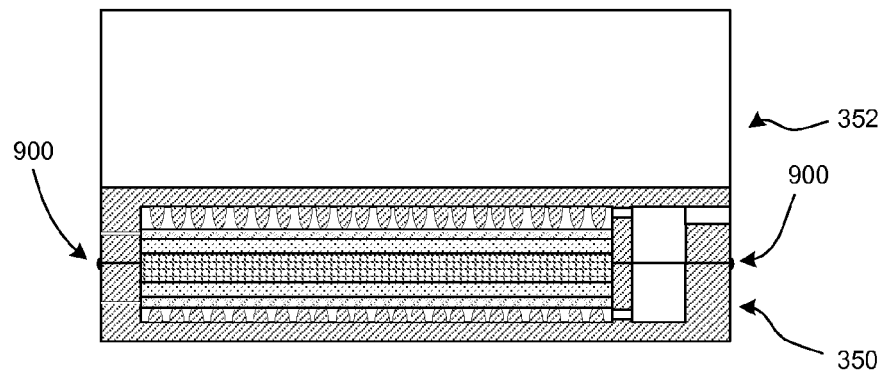
Figure 9B:
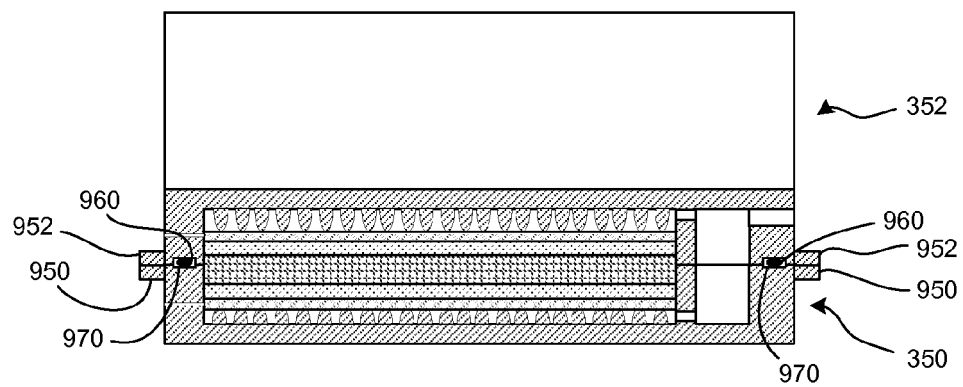

In some implementations, as shown in FIG. 9A, the housing portions 350, 352 are soldered or welded 900 around the perimeter of the interface 354 to provide the hermitic seal. In this implementation, it is also possible to subsequently saturate the interface 354 after it has been soldered or welded 900 with a suitable adhesive such as epoxy. In other implementations, as shown in FIG. 9B, the housing portions 350, 352 are joined at aligned flanges 950, 952 using suitable connectors (such as bolts and nuts, not shown) and the hermetic seal is provided along an O-ring or a gasket 960 provided in a groove 970 around one or more of the housing portions 350, 352.

Figure 10:
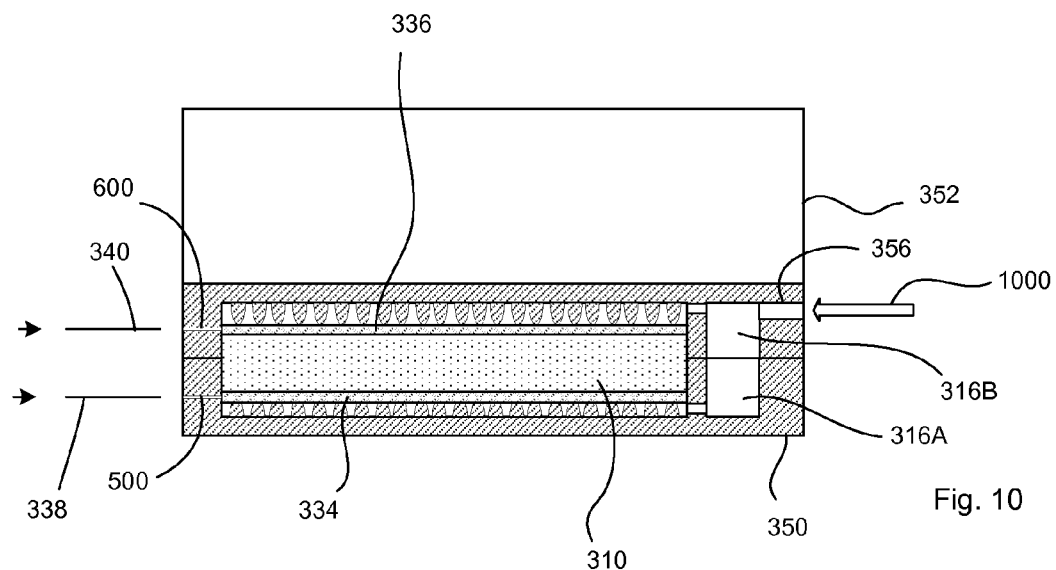
Figure 11:
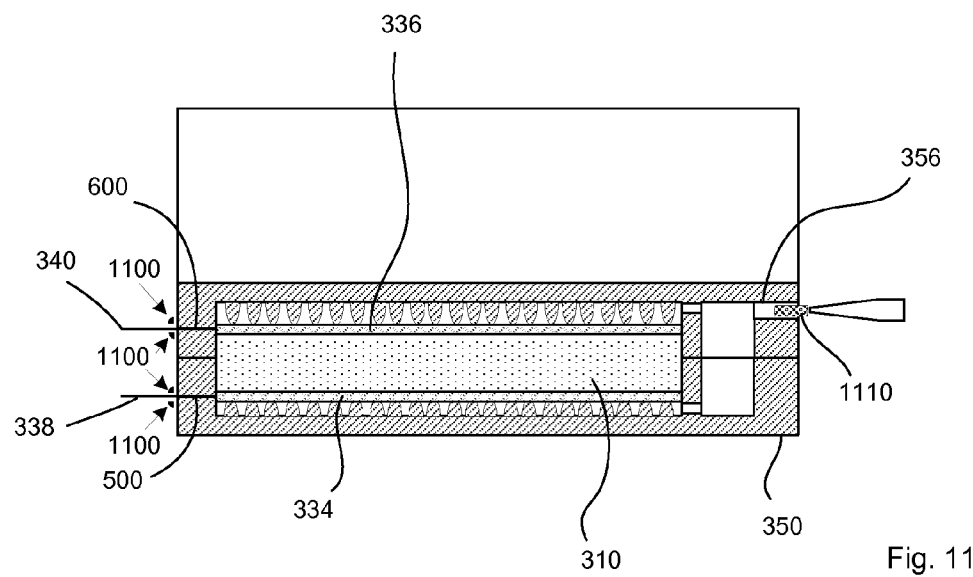

Next, the working fluid is inserted into the cavity or enclosure formed within the housing portions 350, 352 (step 760). For example, as shown in FIG. 10, the working fluid 1000 is inserted through the opening 356. After the enclosure is filled with the working fluid (step 760), the remaining openings of the housing portions 350, 352 are hermetically sealed (step 770). For example, as shown in FIG. 11, the openings 500, 600 are sealed with a suitable adhesive 1100 such as epoxy or solder, and the opening 356 is sealed with a suitable adhesive 1110 such as epoxy.

The self-contained heat transfer systems described herein offer a system that integrates all of the components required to implement heat transfer, such as the electrochemical compressor, a gas mixing device at an output of the compressor (which is needed for a multi-component working fluid having a component that bypasses the compressor), a power connection, and heat transfer devices into a single housing to provide small working devices. Such small working devices are therefore inherently modular. These systems can be made for a wider range of heat transfer applications, for example, for both small and large heat transfer applications. Systems employed in a heat transfer application can be of different sizes and there is no limitation to how many can be used in a particular application. For example, as shown in FIGS. 12-15, the heat transfer systems can be combined to provide the specific cooling or heating requirements depending on the geometry of the device(s) to be cooled. Thus, in FIG. 12, each heat transfer system 1200, 1210, 1220, 1230 is placed at a distinct location on a surface 1240 of a device 1250 to be cooled and because the device to be cooled is planar, the heat transfer systems are planar. In FIG. 13, each planar heat transfer system 1300, 1310, 1320 is placed on surfaces 1330,

1340, 1350 at respective distinct devices 1332, 1342, 1352 that is part of a master system that has a planar shape. In FIG. 14, a single annular heat transfer system 1400 is in thermal communication with a surface 1410 of a cylindrically-shaped device 1420 to cool the cylindrically-shaped device 1420. While in FIG. 15, three annular heat transfer systems 1500, 1510, 1520 are placed in thermally communication at distinct locations on a surface 1530 of a cylindrically-shaped device 1540 to be cooled.

Figure 16:
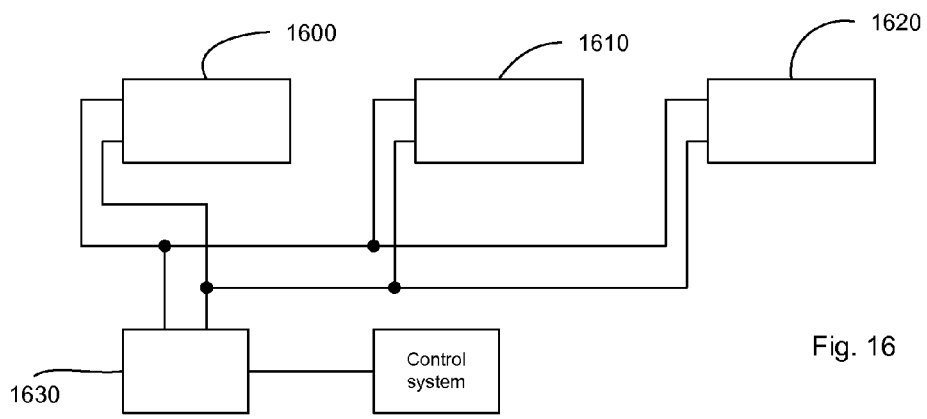
FIGS. 16-18 are electrical block diagrams of exemplary configurations of the power supply with a plurality of heat transfer systems.
Figure 17:
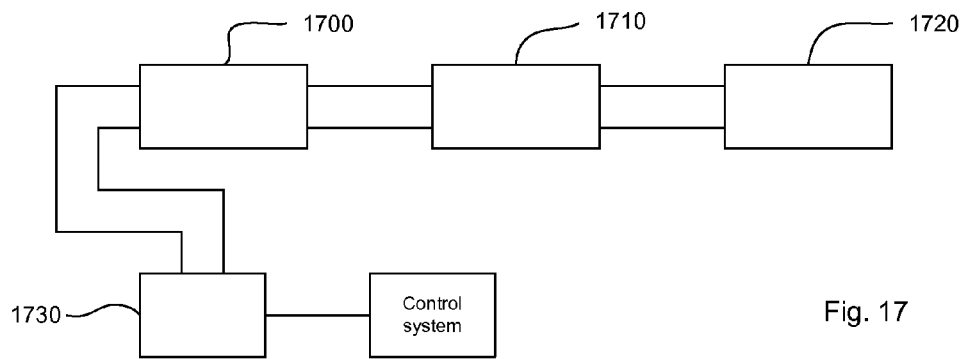
Figure 18:
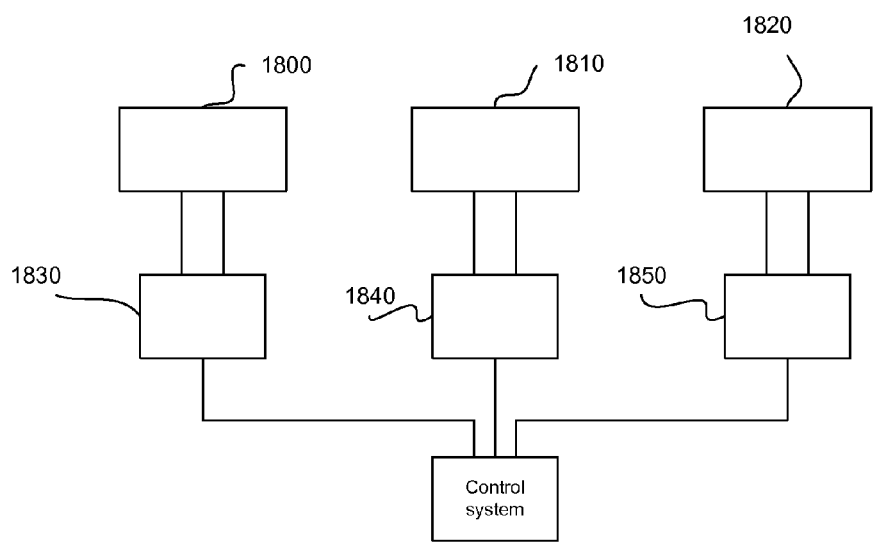

The heat transfer systems can be operated together or separately for specific applications requirements. In some implementations, as shown in FIG. 16, a plurality of heat transfer systems 1600, 1610, 1620 is connected in parallel with a power supply 1630. In other implementations, as shown in FIG. 17, a plurality of heat transfer systems 1700, 1710, 1720 is connected in series with a power supply 1730. In yet other implementations, as shown in FIG. 18, each heat transfer system 1800, 1810, 1820 is connected to a respective power supply 1830, 1840, 1850. Each of the power supplies 1630, 1730, 1830, 1840, 1850 can be controlled by a control system such as the control system 118 shown in FIG. 1.

Referring to FIG. 19, a self-contained heat transfer system 1900 is shown in which the working fluid includes at least the second component 1920 that is a condensable refrigerant that bypasses the electrochemical process within the compressor 110. In this particular implementation, because the condensable refrigerant bypasses the electrochemical compressor 110, while the first component (the electrochemically-active component) 1930 passes through the electrochemical compressor 110, a mixing device 1910 such as that described in U.S. application Ser. No. 12/768,421, filed on Apr. 27, 2010, entitled "Tubular System for Electrochemical Compressor," which is incorporated herein by reference in its entirety, can be used to combine the two components 1920, 1930 of the working fluid before the working fluid is directed to the second heat transfer device (for example, the condenser) 114. The other features of the system 1900 are similar in design to the features of the system 100 and therefore the description of these features in FIG. 19 is omitted.

The energy efficiency of the self-contained heat transfer system described herein depends on the available electrode (anode and cathode) surface area, and the applied current density and operating voltage of the electrochemical compressor.

The self-contained heat transfer systems are able to be integrated because the electrochemical compressor used is reduced in size when compared with prior compressors used in heat transfer applications. If a heat transfer application requires more significant size reductions, the electrode surfaces (the surfaces of the anodes and cathodes) can be reduced even more, the applied current densities and voltages can be increased, and a smaller compressor can be employed. This would result in an almost order of magnitude reduction in size and weight for the heat transfer system compared to conventional mechanical systems.

Since cooling capacity is linked to applied current and voltage, one advantage of the self-contained heat transfer system is that it can modulate from low capacity (that is, low current density at a specific voltage) to a high capacity relatively easily. A heat transfer system designed to operate at high capacities actually becomes more efficient at lower utilizations, while, the exact opposite is true for mechanical systems. Similarly, in a modular configuration, power can be provided to some of the self-contained heat transfer systems (or units), and not others to, for example maintain lower levels of cooling capability.

This feature would allow, for example, refrigerators and other devices to split their cooling capabilities (and even compartment temperatures) without sacrificing system efficiency. For example, a vegetable rack of a refrigerator could be kept at a different temperature than the top rack for liquids. Thus, a control system would operate at two levels; individual units can be controlled, as well as a whole body of units can be controlled for optimum cooling effect for a specific application.

In some applications, such as in electric cars, individual areas of the vehicle can be kept at different temperatures (such as a driver area versus passenger areas) with controls provided to specific seating areas.

As discussed above, controlling the operation of an electrochemical compressor within the self-contained heat transfer system consists of turning its current on or off. Alternatively, one can schedule the voltage applied to the electrochemical compressor in proportion to the source or the sink fluid temperature.

In some implementations, the heat transfer system includes, though does not necessarily require, one or more one-way valves at the output of the electrochemical compressor. The one-way valve can be any mechanical device, such as a check valve, that normally allows fluid (liquid or gas) to flow through it in only one direction (the direction of the arrows). The valves ensure proper delivery of the components of the working fluid that exit the electrochemical compressor into the rest of the heat transfer system by reducing or avoiding back-pressure into the electrochemical compressor, and therefore ensure unidirectional flow of the fluids (which include gases).

What is claimed is:

1. A self-contained heat transfer system that conveys heat from a first heat reservoir at a relatively low temperature to a second heat reservoir at relatively high temperature, the heat transfer system defining a closed loop that contains a working fluid, the self-contained heat transfer system comprising:
    a hermetically-sealed housing that defines an enclosure;
    a first heat transfer device having an exposed surface configured to be in thermal communication with the first heat reservoir;
    a second heat transfer device having an exposed surface configured to be in thermal communication with the second heat reservoir; and
    an electrochemical compressor within the enclosure and between the first and second heat transfer devices, wherein the electrochemical compressor includes one or more electrochemical cells, each electrochemical cell including a gas pervious anode, a gas pervious cathode, and an electrolytic membrane disposed between and in intimate electrical contact with the cathode and the anode.

2. The system of claim 1, wherein the first heat transfer device includes at least a part of the housing.

3. The system of claim 1, wherein the exposed surface of the first heat transfer device is a surface of the housing.

4. The system of claim 1, wherein the first heat transfer device is at least partly within the enclosure.

5. The system of claim 1, wherein the second heat transfer device includes at least a part of the housing.

6. The system of claim 1, wherein the exposed surface of the second heat transfer device is a surface of the housing.

7. The system of claim 1, wherein the second heat transfer device is at least partly within the enclosure.

8. The system of claim 1, wherein the first heat transfer device is configured to transfer heat from the first heat reservoir to the working fluid.

9. The system of claim 1, wherein the second heat transfer device is configured to transfer heat from the working fluid to the second heat reservoir.

10. The system of claim 1, further comprising an expansion space fluidly coupled to the first and second heat transfer devices and configured to reduce a pressure of the working fluid.

11. The system of claim 1, wherein the working fluid contains one or more components that pass through the electrochemical compressor.

12. The system of claim 11, wherein the working fluid contains one or more components that bypass the electrochemical compressor.

13. The system of claim 12, further comprising a mixing system that combines the one or more components that pass through the electrochemical compressor with the one or more components that bypass the electrochemical compressor.

14. The system of claim 12, wherein the one or more components that bypass the electrochemical compressor include a condensable refrigerant.

15. The system of claim 14, wherein the condensable refrigerant does not participate in the electrochemical process.

16. The system of claim 11, wherein the one or more components that pass through the electrochemical compressor include an electrochemically active fluid that participates in the electrochemical process within the electrochemical compressor.

17. The system of claim 11, wherein the one or more components that pass through the electrochemical compressor include one or more of methanol, ethanol, and water.

18. The system of claim 1, wherein the working fluid contains a single component that passes through the electrochemical compressor and that is both electrochemically active and is a refrigerant.

19. The system of claim 1, wherein the first heat transfer device comprises a condenser.

20. The system of claim 1, wherein the second heat transfer device comprises an evaporator.

21. The system of claim 1, wherein the exposed surfaces of the heat transfer devices are planar.

22. The system of claim 1, wherein the exposed surfaces of the heat transfer devices are cylindrical such that the housing is annular.

23. A method of manufacturing a self-contained heat transfer system, the method comprising:
  preparing a first portion of a housing, wherein the first housing portion includes a thermally-conductive wall;
  preparing a second portion of the housing, wherein the second housing portion is sized and shaped to mate with the first housing portion and includes a thermally-conductive wall;
  inserting an electrochemical compressor between interior surfaces of the thermally-conductive walls of the first and second housing portions;
  pressing the first and second housing portions together to form an enclosure that receives the electrochemical compressor such that the exterior surface of the first housing portion thermally-conductive wall is able to be exposed to a first heat reservoir and the exterior surface of the second housing portion thermally-conductive wall is able to be exposed to a second heat reservoir;
  inserting a working fluid into the enclosure through an opening; and
  hermetically sealing the first and second housing portions together and sealing the opening to define a closed loop that contains the working fluid in the enclosure.

24. The method of claim 23, further comprising forming an expansion fluid passage in the first housing portion and forming an expansion fluid passage in the second housing portion, wherein the expansion fluid passage in the first housing portion is fluidly linked to the expansion fluid passage in the second housing portion when the first and second housing portions are pressed together.

25. The method of claim 24, wherein the expansion fluid passage in the first housing portion is fluidly coupled to a cavity formed between the first housing portion and the electrochemical compressor.

26. The method of claim 25, wherein the expansion fluid passage in the second housing portion is fluidly coupled to a cavity formed between the second housing portion and the electrochemical compressor.

27. The method of claim 26, wherein the closed loop is formed such that fluid passes through the expansion fluid passage in the second housing portion, through the expansion fluid passage in the first housing portion, through the cavity in the first housing portion, through the electrochemical compressor, through the cavity in the second housing portion, and back to the fluid passage in the second housing portion.

28. The method of claim 26, wherein forming the expansion fluid passages includes forming the expansion fluid passages to have a size that enables a reduction in pressure of the working fluid as it passes through the expansion fluid passages.

29. The method of claim 23, wherein hermetically sealing the first and second housing portions together includes one or more of:
  welding the first and second housing portions together,
  curing adhesive between the first and second housing portions,
  soldering the first and second housing portions together, and
  inserting a gasket between the first and second housing portions before pressing the first and second housing portions together.

30. The method of claim 23, wherein sealing the opening includes filling the opening with a leak-free adhesive.

31. The method of claim 23, wherein preparing the first housing portion includes forming the first housing portion into an annular shape.

32. The method of claim 31, wherein preparing the second housing portion includes forming the second housing portion into an annular shape.

33. The method of claim 23, wherein preparing the first housing portion includes forming the first housing portion into a planar shape.

34. The method of claim 33, wherein preparing the second housing portion includes forming the second housing portion into a planar shape.

35. The method of claim 23, wherein preparing each of the housing portions includes die casting each of the housing portions.

36. The method of claim 23, wherein preparing each of the housing portions includes machining each of the housing portions.

* * * * *